(No Model.)  3 Sheets—Sheet 1.
D. D. RANNEY.
MACHINE FOR FORMING AND SOLDERING SHEET METAL CANS.
No. 518,375. Patented Apr. 17, 1894.
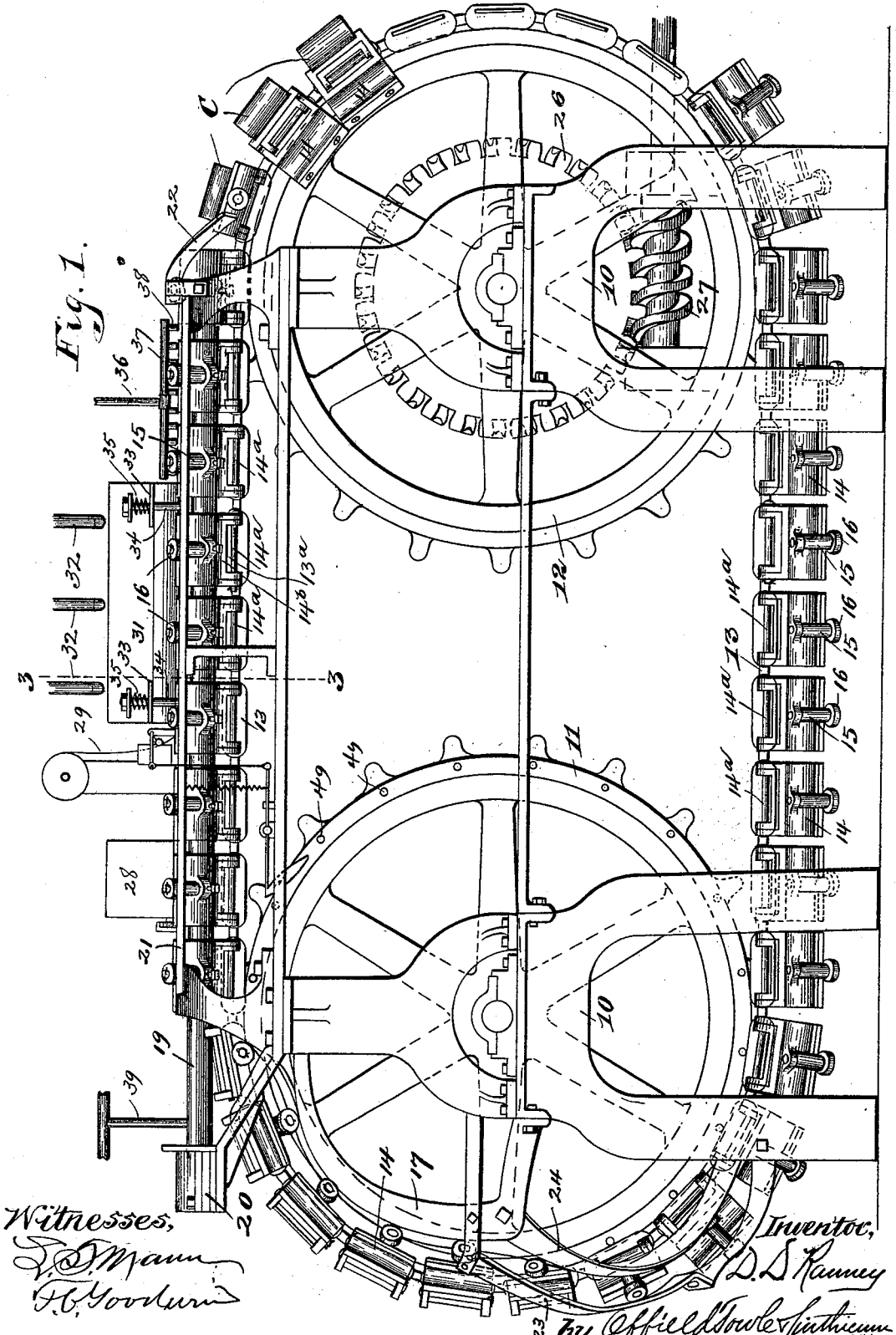

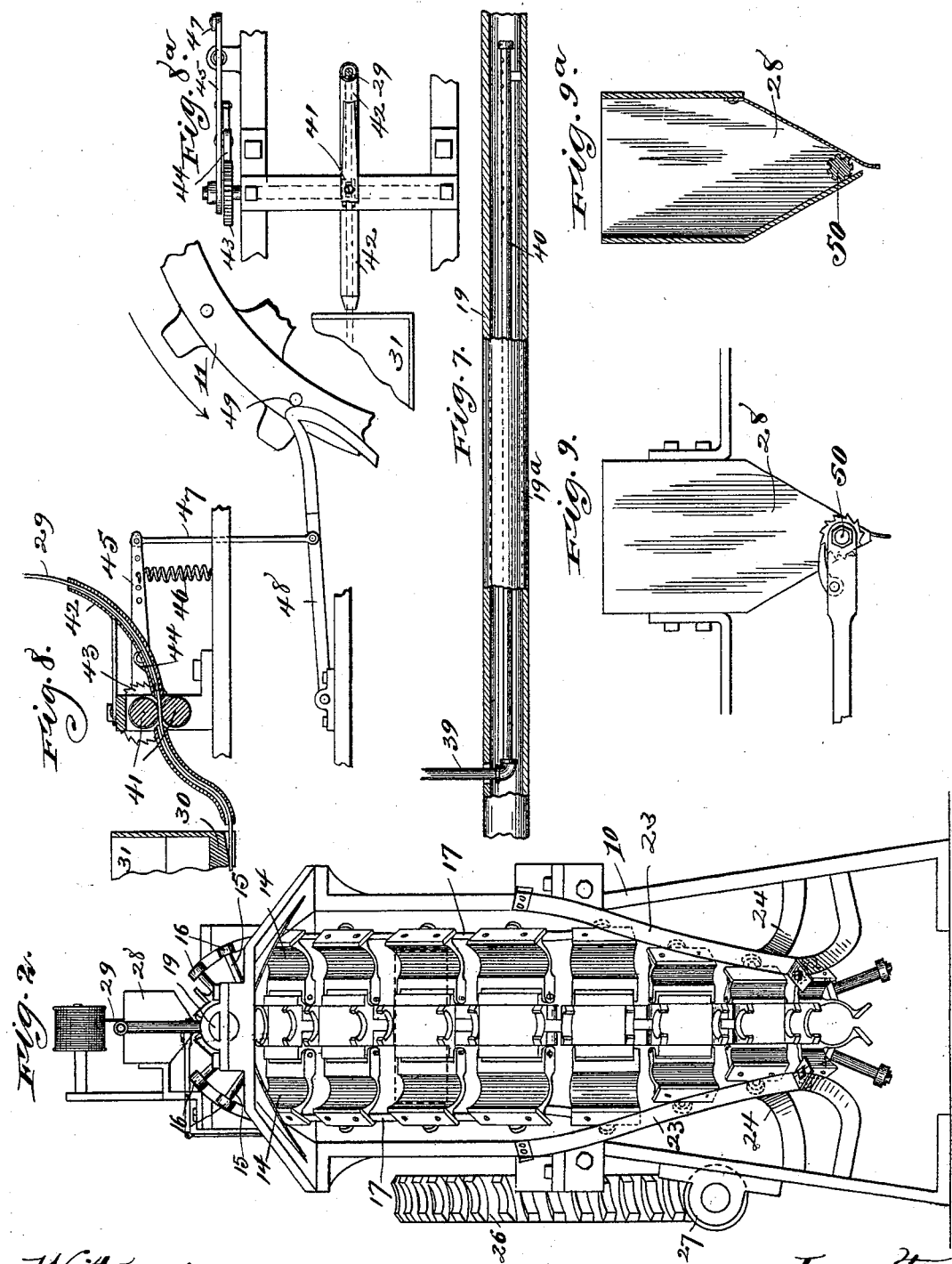

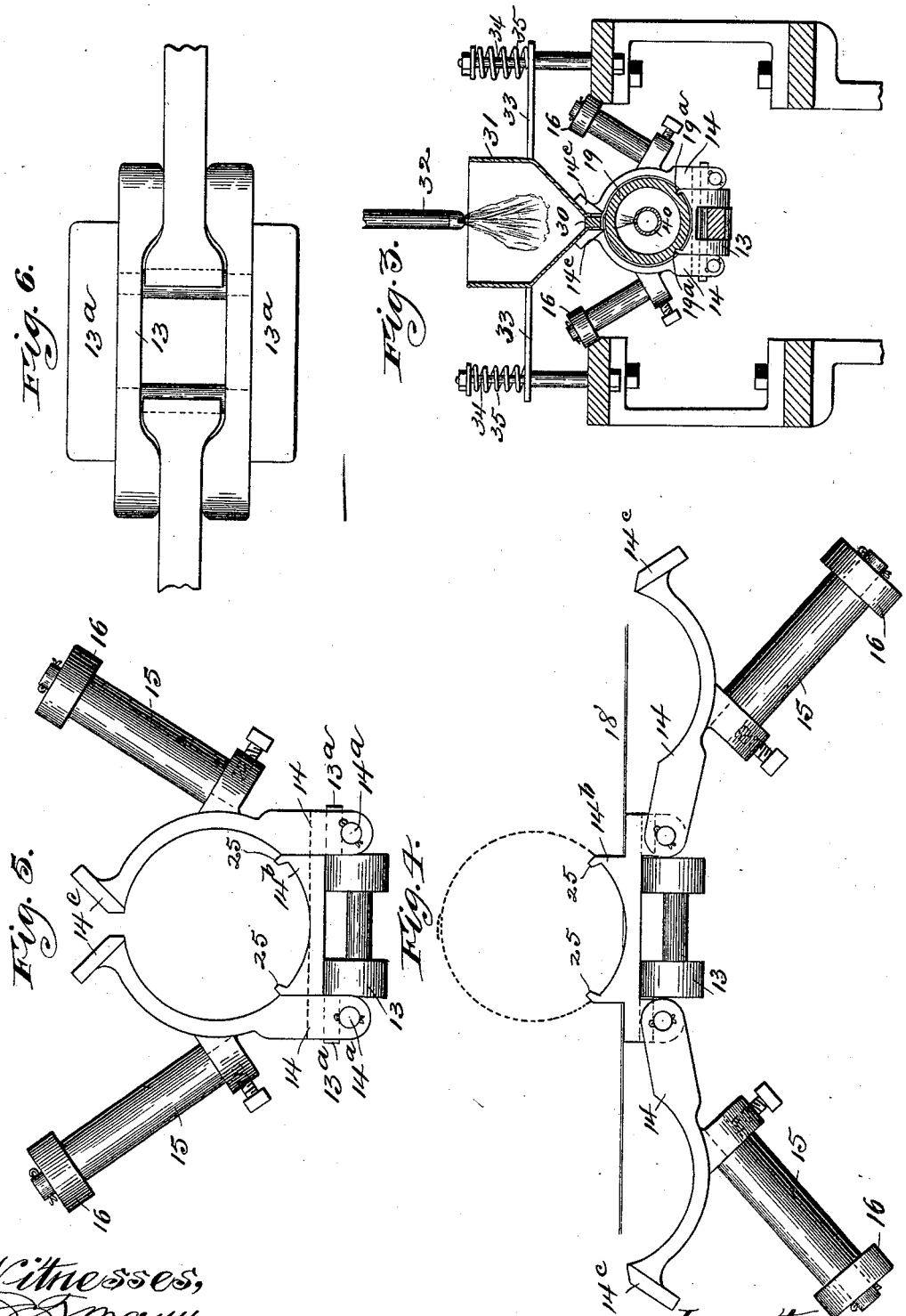

UNITED STATES PATENT OFFICE.

DARWIN D. RANNEY, OF LEWISTOWN, ILLINOIS, ASSIGNOR, BY MESNE ASSIGNMENTS, TO MOSES TURNER, TRUSTEE, OF SAME PLACE.

MACHINE FOR FORMING AND SOLDERING SHEET-METAL CANS.

SPECIFICATION forming part of Letters Patent No. 518,375, dated April 17, 1894.

Application filed May 16, 1893. Serial No. 474,450. (No model.)

*To all whom it may concern:*

Be it known that I, DARWIN D. RANNEY, of Lewistown, in the county of Fulton and State of Illinois, have invented certain new and useful Improvements in Machines for Forming and Soldering Sheet-Metal Cans, of which the following is a specification.

This invention relates to a machine for forming sheet metal cans and soldering the side seams thereof. The machine may be adapted for forming straight bodied cans, either round, square or of any other uniform cross section, and is so organized that all of the operations are performed automatically, save the feeding of the blanks, and this of course may be done mechanically or manually. The machine is so constructed that a series of cans in different stages of formation are operated upon simultaneously and as the capacity of the machine is very large thus organized the cost of manufacture is reduced. In the organization of the machine of the preferred form there is employed a stationary horn or mandrel which is of such cross section as to give the desired shape to the can body and in the present machine is cylindrical. This horn is of such length that several can bodies are engaged upon it at the same time. This horn is mounted over a frame in which is journaled two large sprocket wheels moving by the teeth thereon an endless, flexible carrier, preferably a link belt or chain, carrying a number of blank folding devices each comprising two hinged folders which are caused gradually to approach each other, after a blank has been laid thereon, by means of suitable cam tracks. The cams are so disposed as to cause the folders to close at the proper time to bend the blank about the horn or mandrel, and the latter is of such diameter that the edges of the blank will be suitably overlapped, the endless carrier moving continuously and the folded blank with its edges overlapped and tightly compressed between the hinged folders is carried along with the travel of the carrier. In this construction the overlapped seam is presented first to an acid, such as powdered resin, and then the solder is applied and finally the joint is cooled, these several steps of the soldering being effected while the can is being carried along the length of the horn or mandrel. As the folders carrying the can body reach the end of the mandrel they fall apart thus releasing the can which will then be discharged. I preferably effect the soldering by first causing the powdered resin to sift upon the joint and supply the solder from a wire which is automatically fed forward and melted and the liquid solder is suitably spread by a stationary solder knife whose edge is arranged above and parallel to the seam. The horn may be maintained in a heated condition by a gas flame from gas led into its hollow interior by a suitable pipe. The cooling means may be a blast of air delivered through a pipe to a head having jet branches.

In the accompanying drawings, Figure 1 is a side elevation showing the machine complete, except the driving shaft and some of the pipes which are shown broken away, and part of the folders are also omitted. Fig. 2 is an elevation of the receiving end of the machine. Figs. 3 to 5 inclusive are details; Fig. 3 showing a transverse section on the line 3—3 of Fig. 1; Fig. 4 showing the folders open with a blank laid thereon, the dotted lines indicating the appearance of the blank when folded; and Fig. 5 an elevation of the folders in the closed position. Fig. 6 is a bottom plan view of one of the links of the chain carrier, the connecting bars shown broken away. Fig. 7 is a detail view of part of the horn or mandrel, partly in section, showing also the manner of applying heat to the interior of the same. Figs. 8 and 8$^a$ are detail views of a solder feeding device; and Figs. 9 and 9$^a$ are detail views of a rosin feeding device.

In the drawings, 10 represents the frame of the machine in which is journaled the large sprocket wheels 11, 12, over whose teeth are carried the endless belt 13 having open links adapted to engage the sprocket teeth. Upon each link if desired, or upon a less number thereof, are mounted the hinged folders 14, each of which preferably carries a stud 15 having an anti-friction roller 16 thereon. These folders are preferably hinged by pivot pins 14$^a$ to a saddle 14$^b$, and the latter has perforated lugs through which the pivot pins pass. Said pins pass below the wings 13ª of the open links of chain 13 and are arranged parallel to the direction of travel of the belt so that the folders open laterally, as seen in Fig. 4, and are adapted to be brought to the position shown in Figs. 3 and 5, a slight clearance being permitted between their upper ends when closed to their limit in order that they may pass the soldering iron hereinafter described. The folders 14 terminate at their upper ends in shoes 14ᶜ made of aluminum. These shoes are disposed practically at right angles to each other, while their lower adjacent corners are truncated so that when the folders are at the limit of their movement toward each other, said truncated portions are parallel to each other and are adapted to embrace closely between them the soldering iron, while the inclined portions of such shoes embrace the lower sides of a trough shaped vessel 31. The aluminum shoes embrace the soldering iron closely and the metal of which they are composed having no affinity for the molten solder will remain clean at all times.

There is formed upon the frame or secured thereto cam tracks 17 which are arranged at the receiving end of the machine. These tracks are of such configuration that as the folders are carried above the plane of the axis of the sprocket wheels they are brought into the position shown in Fig. 4. At this point the blank 18 will be laid upon them in proper position and the sharp incline of the cam tracks will cause the folders to close quickly thus folding the blank into the position shown in Fig. 5 around the horn or mandrel 19. This horn has its forward end secured in a suitable bracket or clamp 20, as seen at the left of Fig. 1, and it is preferably hollow. Its forward end is left free and unobstructed so that the clamps may pass therefrom in their closed position. They are held in such closed position by the straight track rails 21 upon which the rollers 16 pass from the sharply inclined portion of the cam tracks 17. At the rear ends of these rails the guides 22 are placed in order to permit the folders to separate without dropping away suddenly, similarly curved guides 23, 24 being arranged at the forward ends of the machine in order to spread the folders to adapt them to receive the blank. The blank will be held by the projecting points 25 of the saddle 14ᵇ, and said points traverse grooves 19ª in the horn 19 and act as strippers to carry the can along the horn and discharge it therefrom. The sprocket wheels may be driven by means of the worm wheel 26 which is driven by the worm 27.

At 28 is shown a hopper for the discharge of a suitable acid, preferably powdered resin, upon the joint. Beyond the acid receptacle is arranged a solder feeding device which will be adapted to feed the solder wire 29 to the end of the soldering iron 30. Said iron is clamped securely in the bottom of a trough shaped vessel 31 to whose interior a heated flame is supplied from the pipes 32. By this means the soldering iron is kept highly heated at all times and is preferably of a greater length than the length of the can so that it may operate upon two or more cans simultaneously, as clearly shown in Fig. 1 of the drawings. This trough 31 is preferably yieldingly mounted, as, for example, by means of the arms 33 which are adapted to slide on the rods 34, and are normally depressed by the springs 35. Any unusual thickness of the seam will therefore cause the soldering iron to yield slightly, while in its normal position it will be forced closely into contact with the overlapped seam so as to work the solder into the joint thereof. Beyond the soldering iron is arranged the cooling pipe 36 with a head 37 having the jets 38. A blast of cool air may be forced through this pipe, thereby cooling the seam as the can passes from the iron. The horn may be and preferably is heated below the solder iron and this may be done by the flame of a hydro-carbon fuel introduced through pipe 39 and burner tube 40.

The machine above described has its driving wheels arranged vertically, but they might be arranged horizontally and a horn might be employed upon each side if so arranged. The form shown is quite simple because the action of gravity is depended upon to separate the folders to release the can, and the blanks are also carried up without any means for clamping them upon the folders.

Obviously, instead of employing a cylindrical horn or mandrel, the latter might be of a different cross section, as for example, square, polygonal, elliptical, or of a flatted cylindrical form.

I have shown each link of the carrier provided with a pair of folders. This is not essential but in the machine which I have constructed and operated I have so arranged them. Of course the number of cans which may be operated upon simultaneously will depend upon the length of the mandrel and the distance between the centers of the sprocket wheels. A different form of carrier for the folders might be employed but I find the large sprocket wheels advantageous because they afford means, in connection with the cam tracks and guides, for opening and closing the folders at the proper intervals to receive and bend the blank and to discharge the can. In the machine which is shown eight of the folders are engaged upon the mandrel, while one is just passing off therefrom with a completed can and one is just in position to be clamped upon the mandrel. Therefore eight cans are being operated upon at the same time, the soldering iron engaging four of them, the cooling device operating upon two, and the acid being applied to two, while one is just approaching the acid reservoir.

While any suitable devices may be used for feeding the solder and rosin I have shown in Figs. 8 and 8ª an adequate means for feeding the solder wire, and in Figs. 9 and 9ª means for supplying the rosin.

Fig. 8 is a sectional elevation through the feed rolls for the solder wire and showing the end of the solder iron and a fragment of one of the drive wheels with pins thereon for operating the solder feed wheels.

In said drawings, 41 represents a pair of feed wheels which will be suitably roughened in order to feed forward the solder wire 29. Said wire passes down through a curved tube 42, and the feed wheels are actuated intermittently by means of the ratchet 43 which is intermittently moved by the pawl 44 carried on the lever 45, normally depressed by the spring 46 and raised through the rod 47 connected with the actuating lever 48 which engages pins 49 on the periphery of the sprocket wheel 11. The pins are so placed that as the sprocket wheel revolves the feed is actuated at regular intervals and the solder wire is forced down through the curved tube under the soldering iron, as clearly shown in Fig. 8.

The rosin feed comprises a simply hopper bottomed receptacle 28 having the feed wheel 50 which is actuated by means of a ratchet and pawl mechanism moved by pins upon the opposite side of the sprocket wheel 11 and in a manner similar to that described for the solder wire feed.

While I have above described the folding arms as being mounted directly upon the drive chain, it is obvious that they might be mounted upon carriages connected to the drive chain and that such carriages might operate upon horizontally arranged tracks. Prior patents show endless chains having propelling carriages each provided with a mandrel or horn and with folders hinged upon the carriage and adapted to bend the blanks about the horn at a certain stage in the operation and means for applying solder to the seams after the can is formed. The distinction between my invention and machines of this character is that I employ a horn of greater length than a single can, and it is apparent that where the carrier travels in a horizontal plane a plurality of these long horns may be arranged at different points in the circuit.

I do not limit my invention to the structural details, except as hereinafter pointed out in the claims.

I claim—

1. In a machine for forming the bodies of sheet metal cans and soldering the side seams thereof, the combination with an endless traveling carrier, of a series of movable blank folders connected to and traveling with said carrier, a stationary horn or mandrel of greater length than the can body to be formed, means for operating the folders whereby to bend the blank about the horn, and soldering appliances arranged adjacent to the horn whereby a series of can bodies may be operated upon simultaneously, substantially as described.

2. In a machine for forming the bodies of sheet metal cans and soldering the side seams thereof, the combination with an endless traveling carrier, of a series of movable blank folders connected to and traveling with the carrier, stationary cam tracks adapted to operate the folders whereby to bend the blanks, a stationary horn or mandrel of greater length than the can body and about which the blank is bent, and soldering appliances arranged adjacent to the horn and adapted to apply the solder to the side seams thereof while the can bodies are being moved along the horn, substantially as described.

3. In a machine for forming the bodies of sheet metal cans and soldering the side seams thereof, the combination with a frame having driving wheels journaled thereon, an endless flexible carrier carried around and driven by said wheels, blank folders hinged to said carrier, a stationary cam track adapted to operate the hinged folders, a stationary horn or mandrel of greater length than the can body, and soldering appliances arranged adjacent to the horn and adapted to apply solder to the side seams thereof while the cans are moved along the horn by the folders, substantially as described.

4. In a machine of the class described, the combination with the endless carrier, of folders hinged to said carrier, said folders having studs provided with rollers, cam tracks for moving the folders to form the body, a stationary horn or mandrel along which a series of cans may be simultaneously passed and straight tracks for confining the holders and cans along the mandrel, substantially as described.

5. In a machine of the class described, the combination with an endless carrier, of movable folders mounted thereon, cam tracks for operating the folders, a stationary hollow horn or mandrel, means for heating the interior of the horn, and soldering appliances arranged in line with the horn and adapted to apply solder to the side seams of the cans while moving along the horn, substantially as described.

6. In a machine of the class described, the combination with an endless carrier having movable folders connected and traveling therewith, cam tracks for operating the folders, a stationary horn around which the blanks are folded, means for applying acid to the seam, a device for feeding a solder wire and melting the wire over the seam, and a solder knife arranged in line with the seam and adapted to work the solder into the joint, substantially as described.

7. In a machine of the class described, the combination with the endless carrier composed of a link belt, a saddle removably secured to the links of the belt and having points to engage the can blank, folders hinged to the saddle, cam tracks for operating the folders and a grooved horn on which the blanks are bent and along which they are moved by the points traversing the grooves of the horn, substantially as described.

DARWIN D. RANNEY.

Witnesses:
A. M. HESTOR,
W. M. BEGGS.